United States Patent

[11] 3,618,711

| [72] | Inventor | George W. Vollmer<br>Chardon, Ohio |
|---|---|---|
| [21] | Appl. No. | 44,125 |
| [22] | Filed | June 8, 1970 |
| [45] | Patented | Nov. 9, 1971 |
| [73] | Assignee | Eaton Yale & Towne Inc.<br>Cleveland, Ohio |

[54] LUBRICATION SYSTEM FOR A GEARED-DRIVE MECHANISM
11 Claims, 3 Drawing Figs.

[52] U.S. Cl. ............................................. 184/6.12,
184/6.28, 184/11 A, 417/368, 418/88
[51] Int. Cl. ............................................. F16n 7/36,
F01m 9/06
[50] Field of Search ............................................. 184/11 R,
11 A, 11 B, 6.12, 13 R, 6.28; 74/711; 418/88;
417/368

[56] References Cited
UNITED STATES PATENTS

| 2,027,012 | 1/1936 | Barnes | 184/13 |
| 2,053,542 | 9/1936 | Vandervoort | 184/6.28 |
| 3,083,790 | 4/1963 | McAfee et al. | 184/6.12 |
| 3,146,842 | 9/1964 | Nelson et al. | 184/11 B |
| 3,195,682 | 7/1965 | Reneerkens | 184/11 |
| 3,383,937 | 5/1968 | Toenne et al. | 184/11 X |
| 3,441,106 | 4/1969 | Taylor et al. | 184/11 X |

*Primary Examiner*—Manuel A. Antonakus
*Attorney*—Teagno & Toddy

ABSTRACT: A positive lubrication system for an axle-mounted auxiliary transmission employed in conjunction with a truck axle. A conventional wiper system transfers lubricant from the axle to a power divider for a tandem axle or to a transfer case for a single axle, and a bearing located in the partition wall separating the power divider or transfer case and transmission units is utilized as a pump to deliver lubricant to the transmission. Lubricant pumped to the transmission is returned to a sump by means of core passages in the power divider/transfer case and transmission housing.

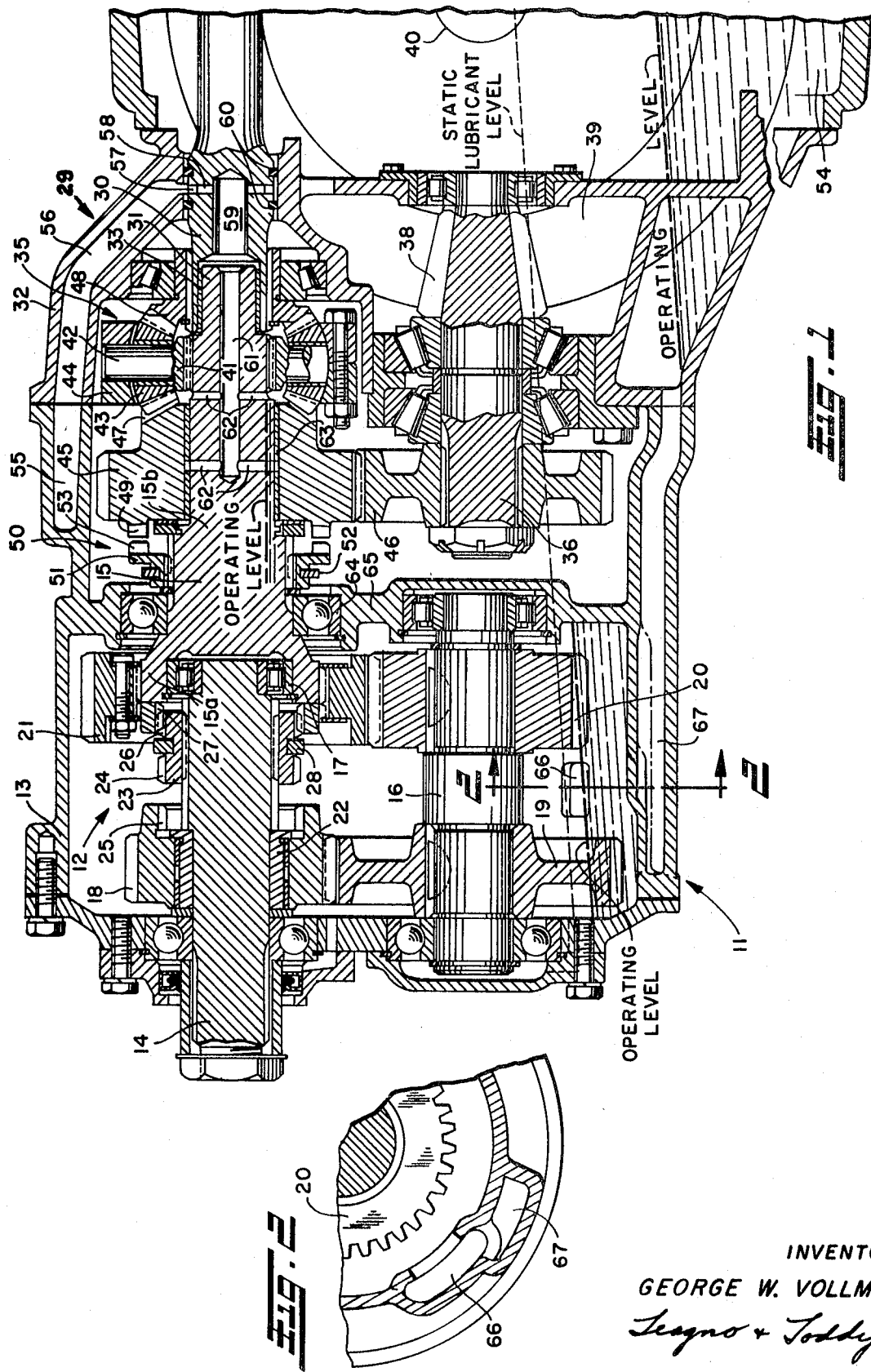

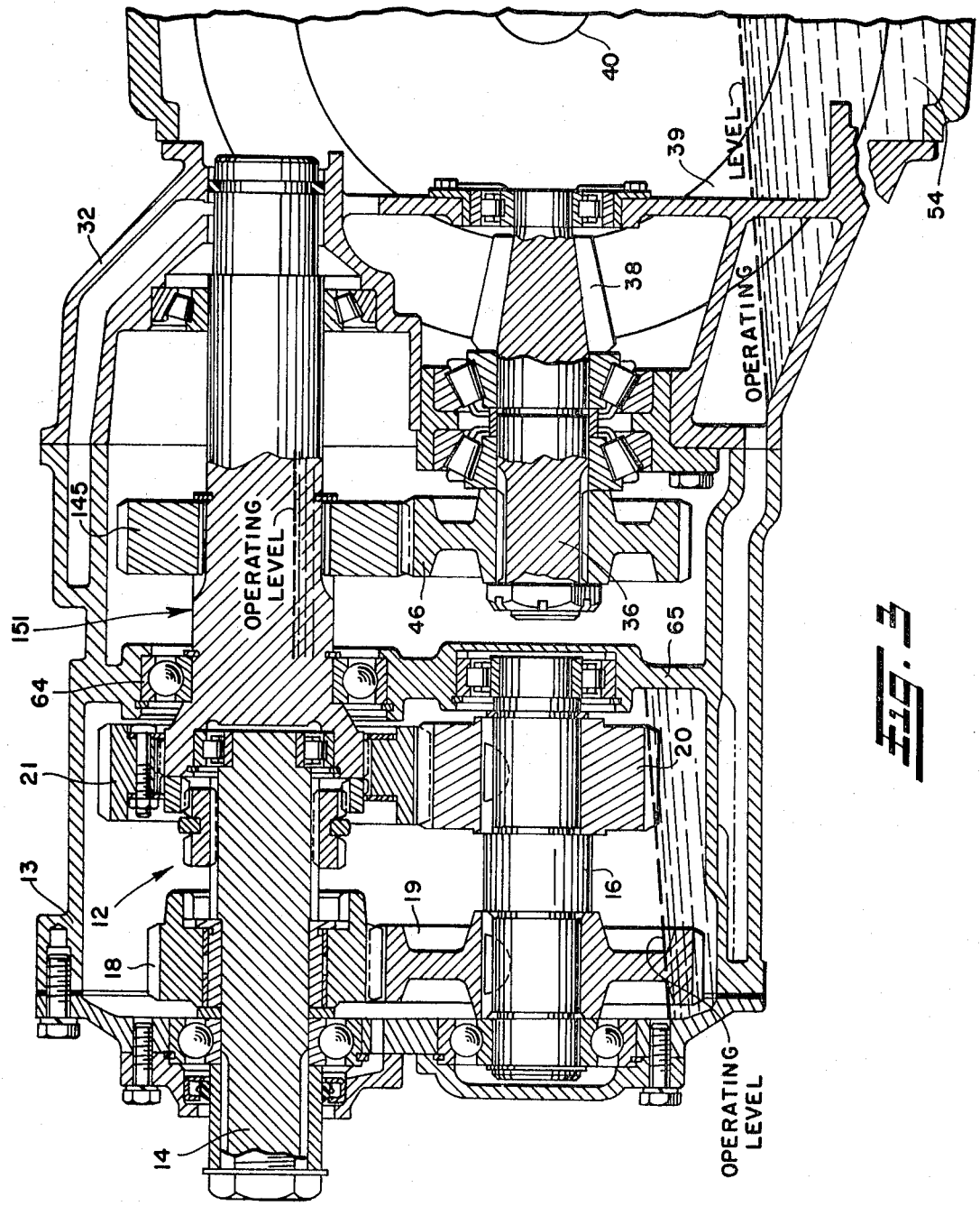

LUBRICATION SYSTEM FOR A GEARED-DRIVE MECHANISM

The present invention relates to an improved lubrication system for a geared drive mechanism and, in particular, to a system for providing positive lubrication of an auxiliary transmission for a drive axle.

Tandem drive axles for use in heavy-duty trucks employ an interaxle differential unit, generally located ahead of the front drive axle, which provides a differential relationship between the two driving axles under normal operating conditions. Provision is made to "lock out" this differential unit under adverse conditions when the differential action would cause a loss of traction. Such power dividers can include a transmission unit at the input to provide one or more additional gear ratios at the input to the drive axles.

Transmissions of this type are normally lubricated by means of a splash arrangement in which one or more gears are partially immersed in a lubricant sump and pick up lubricant therefrom to distribute it to other gears in the system as the gears rotate. Rotation of the gears also causes some of the lubricant to be thrown outward to reach other components such as support bearings.

While such a system is satisfactory in many situations, the proper distribution of lubricant is complicated by the numerous walls and webs common to mechanisms of this type, and at high speeds the lubricant tends to be thrown from the immersed gears too fast to be properly distributed to the other gears. Thus, during high-speed operation there is less lubricant available than during low-speed operation—just the opposite of the optimum condition. The result is increased gear wear and reduced service life of the drive system.

A further drawback to depending solely upon splash lubrication is that at varying speeds the lubricant does not follow a consistent path as it is thrown from the gears, owing to the complex geometry of the interior of the transmission housing.

Where an auxiliary transmission of this type is to be used for a single axle, it has been found to be convenient to use the same housing as that used for a tandem, simply eliminating the interaxle differential and replacing one of the side gears with a transfer gear fixed to the transmission output shaft to transfer power to the pinion shaft. This reduces the number of different critical parts which must be made available for a series of axles.

Accordingly, it is an object of this invention to provide an improved lubricating system for a geared drive mechanism.

Another object of the invention is to provide a lubrication system for an axle-mounted auxiliary transmission.

Another object of the invention is to provide a lubricating system which can be employed in conjunction with and supplements a splash system.

Another object of the invention is to provide a positive lubricating system which does not require the use of additional pumps.

Another object of the invention is to provide a lubricating system in which the lubricant flow is substantially proportional to the speed of the gears in the system.

Another object of the invention is to provide a lubricating system, as above, which is particularly adapted for use in a multispeed axle structure used for dividing the power flow between a pair of axles, such as a tandem axle.

Another object of the invention is to provide a lubricating system which will result in substantially increased life of the gears and related components of the geared drive mechanism by providing adequate lubrication under all operating conditions.

To meet the above objectives, the present invention takes advantage of the pumping action of one of the bearings in the auxiliary transmission which becomes partially submerged in lubricant in normal operation. More specifically, the invention provides a transmission having a novel core structure in combination with a bearing located in a partition wall which separates the transmission from a positively lubricated interaxle differential or transfer unit, the bearing serving as a pump to transfer lubricant from the positively lubricated area to the transmission. The core structure provides a lubricant return through opening into the transmission housing and a channel for the lubricant to return to the axle differential unit.

Other objects and advantages of the invention will be apparent from the following description when taken in connection with the accompanying drawings, wherein: FIG. 1 is a sectional elevation view of an auxiliary transmission assembly incorporating the invention as applied to a tandem axle;

FIG. 2 is fragmentary sectional view taken along line 2—2 of FIG. 1; and

FIG. 3 is a sectional elevational view of an auxiliary transmission assembly incorporating the invention as applied to a single axle.

Referring to the drawings, FIG. 1 illustrates a geared drive mechanism 11 comprising an interaxle differential structure which functions as a power divider for driving a tandem truck axle. Such an interaxle differential structure and its relationship to tandem axles is illustrated and described in detail in U.S. Pat. No 3,146,842. Power is transmitted to the power divider through a transmission, designated generally by the numeral 12, which gives multispeed capability to the drive axles.

The transmission 12 includes a housing 13 which encloses and supports an input shaft 14, a shaft 15, which includes both a transmission output section 15a and a power divider input section 15b, and a countershaft 16. The shaft 15 is coaxial with the input shaft 14 and is supported thereon by means of a bearing 17.

Power is transmitted through an input gear 18 mounted on the input shaft for selective engagement therewith; a first intermediate gear 19 fixed to the countershaft 16 and meshed with the input gear; to a second intermediate gear 20, also fixed to the countershaft; and then to an output gear 21, which is meshed with the second intermediate gear and fixed to the output shaft section 15a.

The input gear 18 is mounted for rotation relative to the input shaft on a spacer 22 press fit to the shaft. A toothed clutch-driving member 23 is splined to the input shaft 14 between the input and output gears and includes a first external tooth section 24 engageable with a complemental internal tooth section 25 formed on the input gear 18 and serving as a first clutch-driven member, and a second external tooth section 26 engageable with a complemental, internal tooth section 27 formed on the output gear 21 and serving as a second clutch-driven member. A selector fork 28, operable from outside the transmission, engages the driving member 23 between the tooth sections and slides it along the splined input shaft to engage the driven members to select a desired gear ratio. When the driving member 23 is moved to the left as shown in FIG. 1, power is transmitted from the input shaft through the clutch to the input gear 18, then through the intermediate gears on the countershaft to the output gear 21 and shaft 15. While there is a certain amount of flexibility as to the gear ratios which this system can provide, it is common for such systems to provide a 2:1 reduction.

When the driving member 23 is slid to the right, power is transmitted from the input shaft 14 directly to the output shaft section 15a through the clutch-driven member 27.

As stated above, the shaft 15 includes an input shaft section 15b to the power divider unit, designated generally by the numeral 29, enclosed partly within the housing 13 and partly within a portion 32 of the axle housing. The input shaft section 15b is coaxial with an output shaft 30 and includes a pilot portion 31 which is received within a pilot opening formed within the end of the output shaft, a suitable bushing 33 being provided therebetween. The input shaft section 15b and output shaft 30 are connected together through an interaxle differential unit, designated by the numeral 35.

A second output shaft 36 driven off the first through a clutch and gear train is provided with a bevel drive pinion 38, fixed thereto and meshing with an angle drive, or ring gear 39. The ring gear 39 is drivingly connected to an axle 40 by means of a conventional differential unit (not shown). In a similar manner, the first output shaft 30 is drivingly connected to a tandem axle, also by means of a conventional differential unit.

The power divider, or interaxle differential unit 35, includes a spider 41 splined to the input shaft 15 and includes a plurality of pins 42 which extend radially outward from the center of the spider and support bevel differential gears 43. An annular differential carrier or housing 44 surrounds the spider 41 and the differential gears 43, and supports the outer ends of the pins 42, in a conventional manner.

The gear train driving the second output shaft 36 comprises a combination drive gear 45 mounted on the shaft 15 for relative rotation thereto, which includes a first section meshing with a driven gear 46 fixed to the second output shaft and a bevel section 47 meshing with the differential gears 43. The differential gears are also meshed with another bevel gear 48 splined to the output shaft 30, the gears 45 and 48 corresponding in function to the side gears found in conventional differential units.

The drive gear 45 has a third set of teeth 49 on the front face thereof which serve as the driven member of a lockout clutch 50. The driving member 51 of the clutch is splined to the input shaft 15 and includes an actuating yoke 52, operable in a conventional manner by means of a power cylinder or the like.

When the teeth 53 of the driving member 51 and teeth 49 of the driven member are disengaged, power is transmitted through the spider 41 to the differential unit 35 to permit a differential relationship to exist between the two output shafts 30 and 36. However, when the clutch is engaged, the gear 45 is locked to the input shaft, providing a direct drive to both output shafts, through the spider 41 in the case of output shaft 30, and through gear 46 in the case of the second 36.

The power divider unit 29 is lubricated by two systems. The first system, which is disclosed in detail in U.S. Pat. No. 3,441,106, employs a wiper assembly (not shown) which picks lubricant carried from a sump 54 in the axle 40 by the differential carrier (not shown) associated with the ring gear 39, and directs it forward into the power divider unit. To distribute the lubricant within the power divider, selected passageways are provided within the housing and within the components thereof.

Specifically, the upper portion of the housing 13 surrounding the interaxle differential mechanism 35 has a trough or passage 55 formed therein, one side of which extends tangentially of and adjacent the gear 45 for receiving oil thrown centrifugally therefrom. The trough 55 extends rearwardly and downwardly to a passage 56 which extends through the wall of the axle housing and communicates with an annular groove 57 in the output shaft 30. A plurality of radial openings 58 communicate between the groove 57 and a central opening 59. Axially spaced O-rings 60 prevent leakage of the lubricant between the shaft 30 and the housing and insure that the lubricant from trough 55 will be transported to central opening 59 through the radial openings 58. The central opening 59 communicates with the pilot opening in shaft 30 and with a central opening 61 within the input shaft section 15b. Input shaft section 15b has a plurality of radial openings 62 extending from central opening 61 to communicate with the area adjacent the differential unit 35 and with a sleeve bearing 63 which supports the gear 45.

Thus, lubricant from the sump 54 is carried into the power divider unit by the wiper assembly and by rotation of the gear 46. As the lubricant is transferred from gear 46 to gear 45, it is thrown centrifugally to the trough 55. From here the lubricant flows by gravity rearwardly and downwardly through the passage 56, the annular groove 57 and the radial openings 58. Thereafter, the lubricant travels along bushing 33 between the shafts 15 and 30 and through central opening 61 to the radial openings 62 and outward into the system.

While such a system has proved effective for the power divider unit, the transmission unit 12 is too remote from the axle 40 to take direct advantage of the wiper system, and heretofore a simple splash system has been employed, depending on the gears 19 and 20 to pick up oil from the sump and transfer it to the remaining gears and components. (It should be noted that the static sump level denoted by the broken line in FIG. 1 is inclined to about 4° to the horizontal due to the normal mounting angle of the axles with respect to the vehicle).

The present invention provides positive means for distributing lubricant to the transmission 12 to supplement the splash system. Although, as stated above, the wiper system provided in the power divider 29 is too remote to directly supply the transmission 12, a sufficient quantity of lubricant is available to the power divider if means are provided to transfer the lubricant from the power divider to the transmission. According to the invention, a bearing 64, which is located in a partition wall 65 separating the transmission from the power divider and supports the output shaft 30, is utilized as a pump to transfer lubricant from the power divider to the transmission. Although the bearing is illustrated herein as being of the ball type it can be appreciated that other types of bearings, such as roller bearings, having an inner race, an outer race, and spaced rotary members between them, would serve equally well. Ordinarily, a bearing such as this, located in a partition wall, is sealed in order to prevent transfer of lubricant between the differential and transmission. However, the present invention is based on the discovery that by providing an effective return flow path back to the sump, the pumping action of a rotating ball bearing, or the like, can be used to advantage to provide a positive flow of lubricant to the transmission. Accordingly, instead of sealing the bearing the partition wall and adjacent components of the drive mechanism are arranged such that a definite flow path is provided through it.

By controlling the amount of lubricant directed to the power divider by the wiper system or other system which may be used, a lubricant level can be maintained within the power divider which will insure that the bearing 64 is at least partially immersed at all times when the unit is operating. For example, it has been found that an operating level nearly as high as the centerline of the input and output shafts 15 and 30, can be maintained as shown between the partition wall 65 and the axle housing 32 with the system described.

With a portion of the bearing so immersed the balls and their retainers act as a pump, transferring lubricant from the area of the power divider to the transmission. As the lubricant is discharged from the transmission side of the bearing it follows two distinct paths. The first is from the upper portion of the bearing 64, around the output gear 21 toward the input gear 18 at the front of the transmission, and the second is from the lower portion of the bearing 64 downward toward the intersection of the output and second intermediate gears 21 and 20 and the input and first intermediate gears 18 and 19.

In addition to the lubricant flow, the impingement of lubricant against the output gear 21 causes a lubricant mist to be established in the area between the input and output gears, providing additional lubrication for such components as the clutch and the bearing 17.

To provide a return path for the lubricant pumped into the transmission a trough 66 (FIG. 2) is formed near the bottom of the housing 13, opening into the housing at a level just above the bottom of the second intermediate gear 20 to maintain the operating level indicated in FIG. 1. As the lubricant pumped into the transmission by the bearing 64 drains down to the lower portion of the housing, it flows into the trough 66 and down through a communicating channel 67 back to the sump 54, the operating lubricant level in the sump being somewhat lower than the opening of the channel 67 during operation, as shown.

Referring to FIG. 3, the transmission 12 is illustrated as it is applied to a single axle. It can be seen that the transmission 12, the housing 13, and the output gears 46 and 38 to the axle 40 are identical to those shown in FIG. 1 for the tandem axle. In this embodiment, however, the power divider 35 is deleted and the shafts 15 and 30 are replaced by a single shaft 151 to which the transmission output gear 21 is fixed as before. To transfer power from the transmission output to the output shaft 36, a transfer gear 145, meshing with the output gear 46, is splined or otherwise fastened to the shaft 151.

Because of the absence of the interaxle differential, the lubrication requirements of the transfer case defined by the area between the axle 40 and the partition wall 65 are not severe; however, a wiper system as described above is still employed in order to maintain a normal operating level sufficient to partially immerse the bearing 64.

OPERATION

At rest, the static lubricant level is as shown by the broken line on FIG. 1. As the axle 40 is put into operation, a portion of the sump lubricant is transferred into the area of the power divider (FIG. 1) or transfer case (FIG. 3) and back to the sump at rates which maintain the indicated level therein, partially immersing the bearing 64 which supports the transmission output shaft. The bearing 64 then pumps the lubricant around and against the output gear 21, distributing lubricant throughout the upper area of the transmission 12 and creating an oil mist to lubricate the components not directly affected by the lubricant flow. It can be appreciated that as operating speeds are increased more lubricant will be pumped through the bearing 64 into the transmission, a condition which could not be achieved with the normal splash system alone.

Excess lubricant pumped into the transmission is returned to the sump 54 via trough 66 and channel 67, which are located such that a level is maintained in the transmission sufficient to effect the normal splash lubrication of the gears therein.

I claim:

1. In a geared drive mechanism including a housing;
   a partition wall within said housing;
   a transmission unit disposed on a first side of said partition wall;
   a gear train for transferring power from said transmission to one or more output shafts disposed on a second side of said partition wall;
   a bearing supporting an output shaft of said transmission received within said partition wall, said bearing including an inner race, an outer race and intermediate rotary members received between said races; and
   a lubricant sump communicating with said housing to maintain predetermined lubricant levels on either side of said partition wall;
   the improvement comprising means defining a lubricant flow path through said bearing, whereby said bearing acts as a pump transferring lubricant from one side of said partition wall to the other, and lubricant return means formed in said housing to provide a return path back to said sump for excess lubricant transferred through said bearing.

2. The improvement according to claim 1, in which said lubricant return means comprises:
   a trough formed in said housing and opening into said housing just above the normal operating lubricant level thereof, and
   a channel connecting said trough to said sump.

3. In a geared drive mechanism including a housing;
   a partition wall within said housing;
   a transmission unit disposed on a first side of said partition wall;
   a differential unit disposed on a second side of said partition wall;
   a bearing supporting an output shaft of said transmission unit received within said partition wall, said bearing including an inner race, an outer race and intermediate rotary members received between said races; and
   a lubricant sump communicating with said housing to maintain predetermined lubricant levels on either side of said partition wall;
   the improvement comprising means defining a lubricant flow path through said bearing, whereby said bearing acts as a pump transferring lubricant between said differential and said transmission units, and lubricant return means formed in said housing to provide a return path back to said sump for excess lubricant transferred through said bearing.

4. A transmission assembly for a drive axle comprising:
   a housing;
   a partition wall dividing said housing into distinct chambers;
   a transmission unit including input and output shafts and associated gears on a first side of said partition wall;
   transfer gears connecting said transmission unit with the drive axle on a second side of said partition wall;
   a bearing located in said partition wall and supporting an output shaft of said transmission unit;
   means associated with said drive axle for transferring lubricant therefrom to said second side of said partition wall to maintain the chamber defined thereby substantially full of lubricant;
   means defining a lubricant flow path through said bearing from one side of said partition wall to the other, whereby rotary elements of said bearing act as a pump to discharge lubricant into said transmission unit; and
   means located in said housing on the transmission unit side of said partition wall defining a lubricant return path to said drive axle.

5. Apparatus according to claim 4, in which said lubricant return path comprises:
   a trough formed in said housing in the area of said transmission unit, and a channel formed in said housing connecting said trough to a lubricant sump in said axle.

6. Apparatus according to claim 5, in which said trough opens into said housing at a level above the bottom thereof a distance sufficient to insure that a portion of said gears are immersed in lubricant at all times.

7. Apparatus according to claim 4, in which said means for transferring lubricant from said axle to said second side of said partition wall includes means for wiping lubricant from a rotary member associated with the differential of said drive axle.

8. Apparatus according to claim 4, in which said bearing comprises:
   an inner race rotatable with said output shaft,
   an outer race stationary within said partition wall, and
   a plurality of rotary antifriction members equally spaced within the annular area between said races.

9. In a transmission unit for an interaxle differential adapted to divide power input to the differential of a tandem drive axle unit, said interaxle differential and transmission unit being mounted in a common housing attached to one of said tandem drive axles;
   a partition wall separating said transmission unit from said interaxle differential unit,
   input and output shafts transmitting power into and out of said transmission unit,
   a gear train connecting said input and output shafts,
   a bearing located in said partition wall and supporting said output shaft,
   means associated with said drive axle for transferring lubricant therefrom to said interaxle differential to maintain said differential unit substantially full of lubricant during operation,
   means defining a lubricant flow path through said bearing from said interaxle differential to said transmission unit, whereby rotary elements of said bearing act as a pump to discharge lubricant into said transmission unit, and
   means located in said housing in the area of said transmission unit defining a lubricant return path to said axle.

10. The improvement according to claim 9, in which said lubricant return means comprising:
    a trough formed in said housing and opening into said housing just above the normal operating lubricant level thereof, and
    a channel connecting said trough to said sump.

11. In a geared drive mechanism including a housing;
a partition wall within said housing;
a transmission unit disposed on a first side of said partition wall, said transmission unit comprising an upper input shaft, an upper output shaft substantially aligned with said input shaft, a lower countershaft disposed parallel to said input shaft, intermeshing input, intermediate and output gears mounted on said shafts;
a differential unit disposed on a second side of said partition wall, said output shaft serving as an input to said differential unit;
a bearing received within said partition wall and supporting said output shaft, said bearing including an inner race, an outer race and intermediate rotary members received between said races; and
a lubricant sump communicating with said housing to maintain predetermined lubricant levels on either side of said partition wall;
the improvement comprising means defining a lubricant flow path through said bearing from the differential side of said wall to the transmission side of said wall, whereby said bearing acts as a pump transferring lubricant from said differential to said transmission, and lubricant return means formed in said housing to provide a return path back to said sump for excess lubricant transferred into the transmission area through said bearing.

* * * * *